No. 823,216. PATENTED JUNE 12, 1906.
M. C. HADDOCK.
BAKING PAN FOR PASTRY CRUSTS.
APPLICATION FILED SEPT. 5, 1905.

Witnesses
J. G. Hinkel
A. E. Hausmann

Inventor
Margaret C. Haddock,
by Foster Freeman & Watson
Attorneys

UNITED STATES PATENT OFFICE.

MARGARET C. HADDOCK, OF BEDFORD, IOWA.

BAKING-PAN FOR PASTRY-CRUSTS.

No. 823,216.      Specification of Letters Patent.      Patented June 12, 1906.

Application filed September 5, 1905. Serial No. 277,063.

*To all whom it may concern:*

Be it known that I, MARGARET C. HADDOCK, a citizen of the United States, residing at Bedford, Taylor county, State of Iowa, have invented certain new and useful Improvements in Baking-Pans for Pastry-Crusts, of which the following is a specification.

My invention is an improvement in pans for baking the crusts of pies, patties, tarts, and other similar pastry articles, the crusts being afterward filled with fruit, sweetmeats, or other suitable material, as usual.

In baking crusts of this character in the ordinary pans without any filling the crusts swell unevenly and lose their shape, presenting an unsightly appearance and frequently leaving too little space for the filling material.

The object of my invention is to overcome this difficulty, and this I accomplish by providing a pan in which the crust is held in shape during the process of baking, thus always insuring a symmetrical product of uniform thickness and pleasing appearance.

Figure 1:
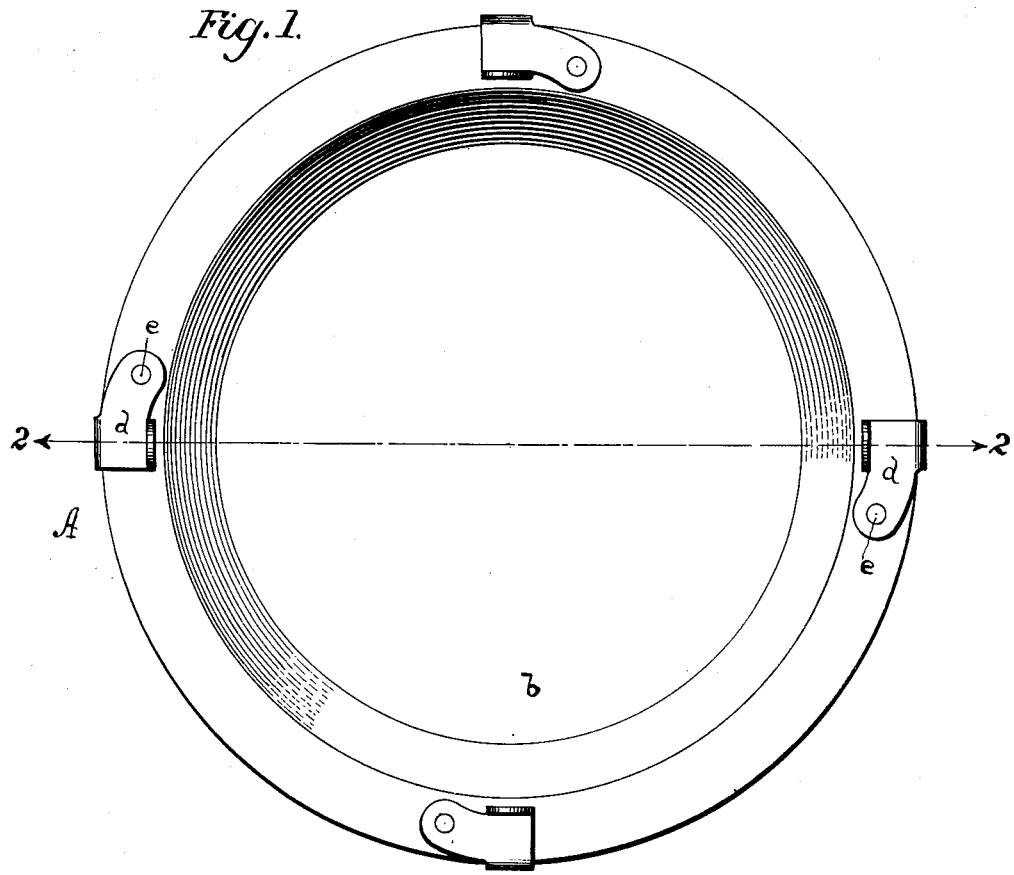
Figure 2:
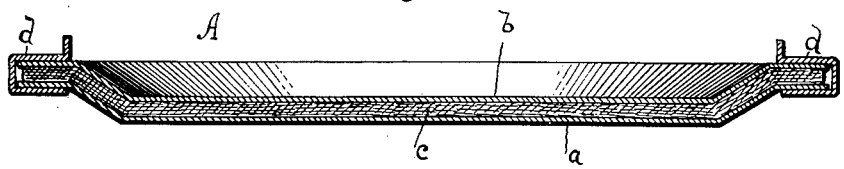
Figure 3:
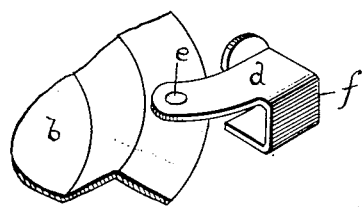

In the accompanying drawings, Figure 1 is a plan view of a baking-pan embodying my invention. Fig. 2 is a cross-section on the line 2 2, Fig. 1; and Fig. 3 is a detail view.

Referring to the drawings, A represents the improved pan, which consists, essentially, of two similar sections $a$ and $b$, adapted to fit one within the other, and suitable means for detachably securing the sections together upon an intervening layer of dough which maintains the sections in their relative position. These sections are made of sheet metal and when in use are nested together, as shown, with an intervening space, forming a chamber for the reception of the layer $c$ of dough. The upper section $b$ is somewhat smaller than the bottom section $a$, so that the intermediate chamber is practically uniform in depth from side to side of the pan, and this chamber is designed to be sufficiently large to provide for the expansion of the dough which takes place in baking.

Any convenient form of clamp may be employed for securing the sections of the pan together when required. As preferred, the upper section $b$ is provided with a plurality of clamps $d$, pivoted thereat at $e$ and having their free ends $f$ so shaped as to clasp the edges of the sections, Fig. 2, when the clamps are swung inward, the outward movement of the clamps freeing the sections and permitting their ready separation.

The manner of using the pan will be apparent and is briefly as follows: The dough rolled out to the proper thickness is placed in the bottom section $a$ and trimmed at the edge as usual. The upper section $b$ is then placed in position above the dough, after which the clamps $d$ are adjusted and the whole is put in the oven, the sections holding the dough between them and maintaining it in shape while it is being baked.

My invention is intended to apply particularly to patty-pans and tart-pans, which on account of their small size are especially liable to the difficulties hereinbefore referred to; but it includes also pans for baking the crusts of pies and other similar articles, and it is obvious that the shape and size of the pan will vary according to the requirements.

It will also be obvious that the pan-sections may be plain or ornamental, as preferred.

Without limiting myself to the precise construction set forth, I claim—

A baking-pan for pastry-crusts, consisting of two similar sheet-metal sections adapted to fit one within the other, with means for clamping the sections together upon an intervening layer of dough, substantially as described.

In testimony whereof I have signed my name to this specification in the presence of two subscribing witnesses.

MARGARET C. HADDOCK.

Witnesses:
     ELIZABETH CARRIGAN,
     JOHN M. HADDOCK.